Figures 1, 2:
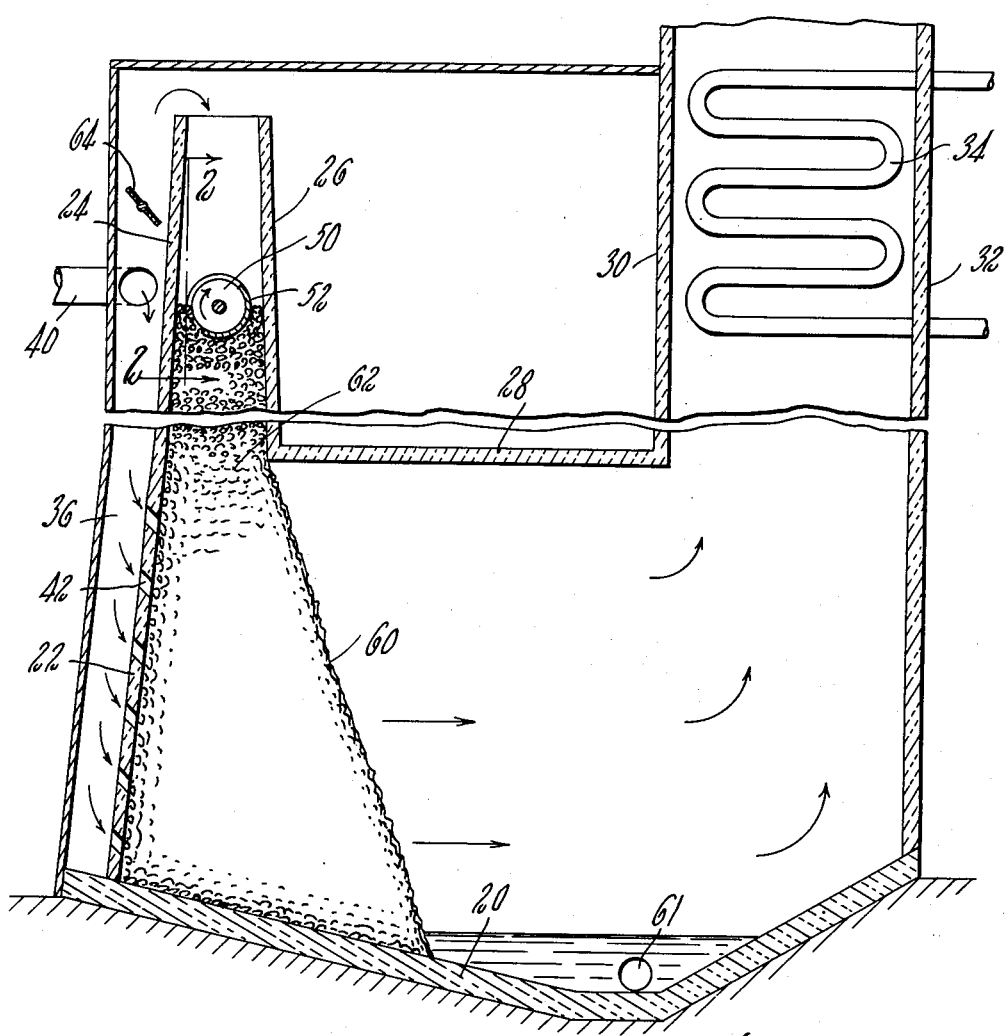

Nov. 6, 1962 E. G. BAILEY 3,062,632
PROCESSING OF SOLID FUEL FOR GAS PRODUCTION
Filed June 1, 1959

3,062,632
PROCESSING OF SOLID FUEL FOR GAS PRODUCTION
Ervin G. Bailey, Easton, Pa., assignor to Bailey Inventions, Inc., Easton, Pa., a corporation of Pennsylvania
Filed June 1, 1959, Ser. No. 817,315
2 Claims. (Cl. 48—203)

This invention relates to the processing of solid fuel for the production of gases having high energy potential and/or for utility for a variety of industrial purposes.

The invention contemplates the heat conversion of carbonaceous solid fuel, in the presence of less oxygen than that required for complete combustion, to gaseous reaction products having high CO content, negligible $CO_2$ content and with or without appreciable hydrogen and/or nitrogen content.

A main object of the invention is to produce such reaction products as clean gas as it emerges from the off-gas surface of a fuel bed constiuted of any free-burning solid carbonaceous fuel. Quality fuel is not essential since the off-gases, because they are already clean, may be readily utilized, without costly conditioning, as a source of heat energy and subsequently as synthesis gas for the production of hydrocarbons and other valuable industrial products.

The production of such clean off-gases in accordance with this invention is dependent upon a novel principle of continuous solid fuel bed operation which involves avoidance of counter-current flow of (1) fuel and (2) ash with respect to the gaseous reaction products. In normal overfed furnaces the counter-current flow of fuel with respect to products of combustion contaminates the latter with unburned, dirty particles (soot, cinders and smoke) and the counter-current flow of ash tends to solidify the ash as it passes into cooler portions of the bed adjacent the air intake, causing clinker formation and hang-ups.

The principle herein utilized provides non-counter-current, i.e. concurrent or cross-flow of both combustion-supporting and off-gases with respect to the direction of fuel feed and slag removal. A wide range of variations in the exact directions of flow of granular solids and gases is thus made available with attendant flexibility depending upon specific production requirements.

Conventional counter-current flow is avoided in accordance with this invention by turning the fuel bed up on end so that the fuel may be fed from the top side of the bed, the liquid non-combustibles gravity-flow in liquid form down through and out of the bottom of the bed and the gases flow towards the off-gas surface which extends from the fuel feed level generally vertically downwards towards the liquid draining surface of the bed. Usually, then, the off-gas surface will lie at an inclination corresponding to the natural angle of repose of the hot fuel bed.

The gaseous flow is directed and maintained by introducing potentially reacting gases mainly from the back side of the bed opposite from the off-gas surface, but some may be introduced with the fuel in down-draft direction.

Release of the reaction products from a surface of the bed which is separate from the fuel replenishing surface insures that unburned particles are no longer carried away from the bed with the off-gases since such particles must proceed from the replenishing surface through the bed before they reach the off-gas surface and in so doing they have a much greater chance of being totally consumed than they do when added counter-currentwise to the reaction products being released from the bed.

An equally important advantage of the bed geometry above described is that it encourages the existence of a wet bed right up to the off-gas surface, since the off-gas surface is no longer being cooled by continuous or periodic fuel addition. Hence, the off-gas surface may be maintained at a sufficiently high temperature to maintain all ash near this surface as molten slag.

With wet bed conditions thus existing at the off-gas surface, the bed acts like a gas washer and unburned particles tend to be bound by the liquid components of the bed and tend to be carried downwardly bound to and with the liquids, thus preventing their escape at the off-gas surface. Since all the non-combustibles are thus maintained at a high temperature throughout the bed, clinker clogging is effectively prevented.

Regardless then of whether gasification of the solid fuel is accomplished by the introduction of oxygen, mixtures of oxygen and air, or with supplemental steam, the cleanliness of the reaction gases as they emerge from the off-gas surface is insured.

The above and other objects and principles of the invention will be understood when taken in connection with the following description of an apparatus for the production of synthesis gas in accordance with this invention, wherein:

FIG. 1 is a diagrammatic sectional view of an apparatus broken away to indicate variation in height, operating in accordance with the invention; and FIG. 2 is a detailed cross-sectional view of a feed mechanism for the apparatus.

As shown, the apparatus includes a refractory supporting surface 20, and a back refractory wall 22 which extends upwardly at a slight inclination and merges into one wall 24 of a fuel feed column, the opposite wall of which is shown at 26 being connected with the top wall 28 of the furnace.

Walls 30 and 32 are the opposite walls of a stack which may contain a heat exchanger, diagrammatically shown at 34.

The rear wall 22 communicates with a plenum chamber 36 which is supplied with the desired reacting materials for example, oxygen, oxygen-air, or a mixture of either with steam from the supply pipe 40.

The rear wall 22 may be formed of refractory bricks spaced from one another at intervals vertically and horizontally to provide tuyeres 42.

While any apparatus for uniformly introducing the solid fuel may be utilized, there is shown in FIG. 2 one suitable form of such apparatus which includes a screw conveyor 50 enclosed in a slotted cylindrical housing 52.

Any kind of free-burning non-coking solid fuel such as anthracite, charcoal, etc., when introduced by such a fuel feed progresses downwardly to form a fuel bed having its rear surface supported by the refractory wall 22 and its forward surface 60 assuming an inclination as in any pile of solid fuel at a natural angle of repose.

The bed is sufficiently thick so that a reducing zone is maintained throughout a substantial portion of the bed with the result that any carbonaceous reaction gas is converted to or maintained in its CO form as distinguished from $CO_2$. Generally, however, the bed will be higher than it is thick, the thickness being limited by the requirement that reducing conditions be maintained right up to the off-gas surface 60.

As will be seen, the oxygen or combination of oxygen and steam introduced through the rear wall progresses substantially horizontally through the bed towards the stack. Suitable dampers (not shown) may be located in the plenum chamber to insure a proper distribution of the gas flow over the height and width of the bed.

With the use of oxygen the combustion of the fuel near the rear of the bed generates extremely high temperatures which insure that the entire bed temperature does not fall below the fluid temperature of the ash from the fuel, even up to the off-gas surface 60. These temperatures are sufficiently high to maintain all ash and other non-combustibles in molten condition so that they continuously flow downwardly and are collected in the form of liquid slag at the bottom of the furnace where they can be removed as a liquid as through a tap 61.

One of the important features of the bed geometry with respect to gas flow is that despite the normal tendency of gaseous flows to develop and follow paths of less resistance through a granular material such as a fuel bed, the cross-flow of fuel with respect thereto (or substantially vertical flow in the apparatus shown) tends to counteract any tendency for the creation of paths of less resistance. Before a path of less resistance can be created, the weight of the fuel causes a redistribution tending to prevent or immediately eliminate the formation of the path of less resistance. All this helps to secure uniformity in operation and to maintain the reducing zone. As previously described, dust particles introduced with the fuel bed must progress downwardly from the fuel replenishing top surface 62 of the bed into the hot portion of the bed and can escape only from the off-gas surface 60 which, being uncooled by the addition of fuel at the surface 60, is extremely hot and wet.

The amount of steam introduced is chosen according to the proportion of $H_2$ gas desired in the off-gases, and/or to limit the bed temperature. The latter objective can be obtained in other ways as by feeding heat absorbing materials, such as bauxite intermixed with the fuel to be recovered as a molten calcium aluminate slag. Similarly, where it is desired to increase the $CH_4$ content of the gaseous reaction products, the furnace may be operated under pressure. For example, appreciable quantities of $CH_4$ may be produced when the operation is at a pressure of about 300 p.s.i. or, operation under pressure in varying amount may be desirable for other reasons, such as more compact gas content giving greater production capacity.

A damper 64 is shown above the plenum chamber so that some gas for preheating purposes may be introduced downwardly through the fuel feed column, if desired, in concurrent down-feed with the solid fuel.

Because of the high heat content of the off-gases, this energy is wholly or partially recovered by suitable heat exchanger equipment, indicated at 34 and the cooled gas is then ready for chemical synthesis, or other uses.

Further modifications of the furnace herein described in order to utilize the bed for the reduction of metal ore is described and claimed in an application filed simultaneously herewith, Serial No. 817,143, now abandoned, in favor of a continuation-in-part application Serial No. 61,633, filed October 10, 1960, and its division Serial No. 173,039, filed February 13, 1962.

What is claimed is:

1. In solid fuel bed operation for the production of a gaseous stream comprising carbon monoxide, the method which comprises maintaining a solid fuel, containing combustible carbon with other non-combustible ingredients, in the form of a bed having top and bottom surfaces connected by generally vertically extending surfaces while replenishing the bed by addition of fuel to its top surface, feeding combustion-sustaining gas transversely through said fuel bed as it descends, from one side of the bed to drive substantially all of the gaseous reaction products out of the opposite side of said bed, maintaining the temperature of said bed at said off-gas surface above the melting point of the non-combustible slag and ash ingredients in said bed to liquefy said ingredients and collecting said liquefied ingredients as they run in liquid form under the influence of gravity down and out of said bed, in a liquid pool maintained at a temperature above said melting point, and tapping said liquid pool to remove said non-combustible ingredients from said pool in liquid form.

2. In solid fuel bed operation for the production of a gaseous stream comprising carbon monoxide, the method which comprises supporting a solid fuel, containing combustible carbon with other non-combustible ingredients, in the form of a bed having its entire bottom resting on a continuous imperforate inclined refractory surface, replenishing the bed with fuel fed at the top of the bed, feeding combustion-sustaining gas from the back side of the bed above the top of said inclined surface substantially horizontally through said bed to drive substantially all of the gaseous reaction products out of the opposite side of said bed while developing a temperature in said bed in excess of the melting point of the non-combustible slag and ash ingredients in said bed to liquefy said ingredients and collecting said liquefied ingredients as they run in liquid form under the influence of gravity down and out of said bed along said continuous suporting surface in a liquid pool maintained at a temperature above said melting point, said pool extending in front of said fuel bed, and tapping said liquid pool to remove said incombustible ingredients from said pool in liquid form.

References Cited in the file of this patent

UNITED STATES PATENTS

| | | |
|---|---|---|
| 725,228 | Deprez et al. | Apr. 14, 1903 |
| 793,305 | Korting | June 27, 1905 |
| 840,461 | Adams et al. | Jan. 8, 1907 |
| 926,729 | Crossley et al. | July 6, 1909 |